United States Patent [19]

Hegedus et al.

[11] Patent Number: 5,539,032
[45] Date of Patent: Jul. 23, 1996

[54] CORROSION RESISTANT SELF-PRIMING ALKYD TOPCOATS

[75] Inventors: Charles R. Hegedus, Coopersburg, Pa.; Donald J. Hirst, Mt Laurel; Anthony T. Eng, Cherry Hill, both of N.J.

[73] Assignee: The United States of America as represented by the Secretary of the Navy, Washington, D.C.

[21] Appl. No.: 472,375

[22] Filed: Jun. 7, 1995

Related U.S. Application Data

[63] Continuation-in-part of Ser. No. 207,448, Mar. 7, 1994, abandoned.

[51] Int. Cl.$^6$ ...................................................... C08J 3/00
[52] U.S. Cl. ...................... 524/204; 524/399; 524/396; 524/414; 524/437; 524/706; 524/724; 524/783; 427/385.5; 427/388.1; 427/388.5; 427/407.1
[58] Field of Search .................................. 524/204, 399, 524/396, 414, 437, 706, 724, 783; 427/385.5, 388.1, 388.5, 407.1

[56] References Cited

U.S. PATENT DOCUMENTS

| | | | |
|---|---|---|---|
| 5,275,645 | 1/1994 | Ternoir et al. | 106/2 |
| 5,403,880 | 4/1995 | Hegedus et al. | 524/204 |
| 5,427,821 | 6/1995 | Hegedus et al. | 427/385.5 |

*Primary Examiner*—Duc Truong
*Attorney, Agent, or Firm*—Susan E. Verona

[57] ABSTRACT

A corrosion-resistant coating which can be applied directly to a surface as a self-priming corrosion-resistant topcoat comprising an alkyd resin binder and a combination of pigments consisting essentially of an aluminum triphosphate, zinc salts of benzoic acids, and an alkaline earth metal phosphate such as zinc-barium phosphate. In addition, the coating contains up to about 40 parts by weight of a titanium dioxide pigment, up to about 2.0 parts by weight of an oil-soluble surface active or wetting agent and up to about 40 parts by weight of at least one organic solvent.

10 Claims, No Drawings

CORROSION RESISTANT SELF-PRIMING ALKYD TOPCOATS

STATEMENT OF GOVERNMENT INTEREST

The invention described herein may be manufactured and used by or for the Government of the United States of America for governmental purposes without the payment of any royalties thereon or therefor.

CONTINUATION APPLICATIONS

This application is a Continuation-In-Part of application Ser. No. 08/207,448, filed Mar. 7, 1994, now abandoned.

BACKGROUND OF THE INVENTION

This invention relates to coating compositions and more specifically to corrosion-resisting coatings which can be applied directly to various surfaces particularly metal either as a high or low gloss, self-priming corrosion-resistant topcoat.

Metal surfaces require the protection of coatings especially when the surfaces are exposed to a corrosive environment. Metal surfaces of aircraft, for example, are exposed to seawater which require protection from corrosion. Specifically, aircraft, e.g., Navy aircraft, are exposed to seawater spray in addition to various acid-forming gases such as sulfur dioxide, carbon dioxide, etc. Moreover, in addition to aircraft, various machinery and equipment in the industrial environments, where fossil fuels are used, need protection against corrosion. It is important therefore that the coating be resistant not only to corrosion but also various chemicals, the weather and at the same time be flexible and have good adhesion to the metal substrates.

The coating systems in the prior art comprise one or more films, i.e., an undercoat, a sealant and a topcoat. Aircraft, for example, traditionally have been coated with high performance two-component protective films consisting of a primer and a polyurethane topcoat. The type of primers used on the aircraft are designed to adhere to the metal surface and help to improve the adhesion of the topcoat and together prevent corrosion of the metal. However, these undercoats require a topcoat, since the undercoats lack flexibility especially at low temperatures (−60° F.) resulting in extensive cracking particularly in high flexed areas of the aircraft. In addition, the undercoats usually lack weather resistance and generally cannot be formulated in different colors required for aircraft.

The alkyd coatings of this invention, however, provide the necessary corrosion resistance, the required degree of flexibility, the desired optical properties, and the needed resistance to weather and various chemicals. Presently, to obtain any or all of these characteristics the prior art multi-film coatings generally required a dry-film thickness ranging up to about 0.005 inches, e.g., up to about 10 mils or more which adds considerable weight to the aircraft. In addition, these prior art coatings are time consuming to apply particularly since there is need for a drying period between each application. Further, the removal of a two-coat system can be difficult and time consuming which also generates high levels of volatile organic compound (VOC) emissions during the operations.

In accordance with this invention, the corrosion-resistant coatings comprise an alkyd resin binder in combination with a unique mixture of corrosion-inhibiting pigments consisting essentially of (1) an alkaline earth metal phosphate, particularly the zinc-bariumphosphates, (2) zinc salts of benzoic acid or substituted benzoic acid, and (3) an aluminum triphosphate. All three of these compounds are essential, in the stated relative proportions, to provide a single coat with the necessary corrosion resistance and adhesion characteristics required of a good top coat. In addition, titanium dioxide ($TiO_2$) including spherical $TiO_2$ particles, e.g., vesiculated beads of $TiO_2$ is included as a pigment together with these metal compounds. The coating compositions of this invention may be applied, as one coat, directly onto various hard surfaces such as metal and do not require an undercoat to provide a corrosion-resistant finish with the desired optical and adhesion properties.

SUMMARY OF THE INVENTION

A corrosion-resistant coating which can be applied directly to a surface as a self-priming topcoat comprising from about 30 to 70 parts by weight and preferably 40–60 parts of an alkyd resin binder and a combination of corrosion-resistant compounds consisting essentially of aluminum triphosphates, zinc salts of benzoic acid, and alkaline earth metal or zinc phosphates such as zinc-barium phosphates, together with oil soluble surface active agents, $TiO_2$ pigment, and organic paint solvents.

Accordingly, it is an object of this invention to provide a corrosion-resistant alkyd coating which can be applied directly to a surface e.g., metal, as a single topcoat.

It is another object of this invention to provide an alkyd coating which is flexible, resistant to corrosion, chemicals, and weathering, and has good adhesion characteristics.

It is still a further object of this invention to provide a coating for use on military or civilian aircraft of reduced thickness to lower the weight thereon while at the same time providing the necessary corrosion resistance.

These and other objects of the invention are accomplished, in accordance with this invention, by providing a corrosion-resistant coating capable of being applied as a single coat.

THE PREFERRED EMBODIMENT

This invention is directed to a corrosion-resistant coating which functions as a primer and a topcoat. More specifically, this invention relates to a corrosion-resistant coating which comprises from about 30 to 70 parts and preferably 40 to 60 parts by weight of the total coating of an alkyd resin binder, and a combination of corrosion-inhibiting pigments. The unique combination of pigments consist essentially of from about 1 to 30 parts and preferably 5 to 20 parts by weight of an alkaline earth metal phosphate, e.g., zinc or zinc-barium phosphate, 0.1 to 10 parts and preferably 0.5 to 2.0 parts by weight of a zinc salt of a benzoic acid or substituted benzoic acid, and about 1 to 30 parts and preferably 5 to 20 parts by weight of an aluminum triphosphate. In addition to the above metal compounds, depending on the opacity, etc., required of the coating, from 1 to 40 parts, and preferably from 8 to 30 parts by weight of titanium dioxide pigment, based on the total weight of the coating, may be added as an additional pigment. Up to about 50% of the total amount of $TiO_2$ may be in the form of vesiculated beads, e.g., from 0 to 33% of the. $TiO_2$ in the coating are beads. Generally, the coating is applied as a high solids organic solution and therefore comprises from 0 to 2.0 and preferably 0.1 to 0.5 parts by weight of at least one oil soluble nonionic or anionic surface active agent and from about 1 to 40 parts, e.g. from 1 to 10 parts by weight of the total coating of at lease one organic solvent, e.g., Mil-T-81772 or various mixtures of paint solvents.

The combination of metal compounds, i.e., salts and/or pigments is unique and consists essentially of specific amounts of an alkaline earth metal phosphate, e.g., zinc phosphate or zinc-barium phosphate etc., zinc salts of benzoic acid or a substituted benzoic acid and an aluminum triphosphate. These metal compounds used alone or in combination with $TiO_2$ provide outstanding corrosion protection and enables the coating to be used as a self-priming, high or low-gloss topcoat. The preferred zinc salts of the benzoic acids have at least one hydroxyl substituent and one $(NO_2)$ group. The zinc salts of the benzoic acids are further characterized as having molecular weights of approximately 100 to 500. The preferred zinc phosphates, e.g., zinc-bariumphosphate are available as Phos-Plus (J0866) from Mineral Pigments Corporation. The aluminum triphosphates are available as K-Whites. In addition to utilizing the above combination of pigments in the required ratios, other known pigments particularly titanium dioxide is added to the coating to provide reinforcing strength and to add color, or improve hiding and opacity of the coating. Other additives that may be used include tinting or coloring agents which may be added to the coating in small but effective amounts including zinc oxide, antimony oxides, barium sulfate, calcium carbonate and one or more of the organic pigments such as the phthalocyanine colors e.g., greens or blues, etc.

Specifically, the corrosion resistant coatings of this invention can be prepared by milling the ingredients set forth in the following Examples.

| Ingredients | EXAMPLE 1 Parts by Weight (Ranges) | EXAMPLE 2 Parts by Weight (Ranges) |
| --- | --- | --- |
| Silicone-Alkyd Resin | 30–70 | 40–60 |
| Titanium dioxide | 1–40 | 8–30 |
| Titanium Dioxide vesiculated beads | 0–20 | 0–10 |
| Alkaline earth metal phosphates (zinc and/or barium phosphates) | 1–30 | 5–20 |
| Zinc salts of substituted benzoic acids | 0.1–10 | 0.5–2.0 |
| Aluminum Triphosphate | 1–30 | 5–20 |
| Oil soluble surface active agents | 0–2.0 | 0.1–0.5 |
| Organic solvents for paints | 1–40 | 1–10 |

EXAMPLE 3

| Ingredients | Parts by Weight |
| --- | --- |
| Alkyd Resin | 47.50 |
| Titanium dioxide | 8.29 |
| Titanium dioxide vesiculated beads | 0.46 |
| Zinc-barium phosphate | 19.92 |
| Zinc salts of a substituted benzoic acid (Sicorin RZ) | 1.99 |
| Aluminum Triphosphate | 15.80 |
| Surface active agents | 0.20 |
| Solvents for paints | 5.85 |

EXAMPLE 4

| Ingredients | Parts by Weight |
| --- | --- |
| Alkyd Resin | 59.43 |
| Titanium dioxide | 25.67 |
| Titanium dioxide vesiculated beads | 0.00 |
| Zinc-barium phosphate | 5.01 |
| Zinc salts of a substituted benzoic acid (Sicorin RZ) | 0.50 |
| Aluminum Triphosphate | 7.79 |
| Surface active agents | 0.20 |
| Organic Solvents | 1.40 |

EXAMPLE 5

| Ingredients | Parts by Weight |
| --- | --- |
| Alkyd Resin | 40.02 |
| Titanium dioxide | 12.07 |
| Titanium dioxide vesiculated beads | 0.37 |
| Zinc-barium phosphate | 18.61 |
| Zinc salts of a substituted benzoic acid (Sicorin RZ) | 1.86 |
| Aluminum Triphosphate | 18.96 |
| Surface active agents | 0.20 |
| Organic Solvents | 7.91 |

EXAMPLE 6

| Ingredients | Parts by Weight |
| --- | --- |
| Alkyd Resin | 49.62 |
| Titanium dioxide | 11.20 |
| Titanium dioxide vesiculated beads | 1.17 |
| Zinc-barium phosphate | 18.77 |
| Zinc salts of a substituted benzoic acid (Sicorin RZ) | 1.87 |
| Aluminum Triphosphate | 11.49 |
| Surface active agents | 0.20 |
| Organic Solvents | 5.68 |

The coatings prepared in accordance with this invention comprises a combination of the alkyd resin with a mixture of the pigments as disclosed in the examples. The coatings were subjected to corrosion resistance test and found to be resistant to corrosion for periods ranging up to 500 hours in a $SO_2$-Salt Fog Test and up to 1,000 hours in the Salt Fog Test.

Preferably, the coatings are prepared by mixing all of the ingredients, and then milling the mixture to a fineness of about 5 for camouflage and 7 for high gloss colors on the Hegman scale according to ASTM D1210. The coating is applied on the substrate at thickness ranging from about 0.001 to 0.003 inches, e.g., up to about 10 mils preferably 1 to 3 mils. The coating may be applied by various methods including spraying, rolling, or brushing onto the surface depending on the viscosity. The viscosity of the coating for the particular application may be achieved by adjusting the content of the solvent within the ranges specified herein and by the selection of the particular reactants used to form the alkyd resin. After the coating is applied to the surface, the solvent is evaporated at room or elevated temperatures and is allowed to cure to a film thickness having the desired properties. The pigments can be introduced into the coating by first forming a mill base which can be formed, for example, by conventional sand-grinding or ball milling techniques and then blended, by simple stirring or agitation, with the other ingredients of the coating.

The specific combination of the aluminum triphosphate, zinc salt of benzoic acid, e.g., zinc benzoate and an alkaline earth metal phosphate, e.g., zinc or zinc-barium phosphates, improved the corrosion resistance while retaining all the other desirable characteristics required of a coating. The specific combination of the aluminum triphosphate, zinc salts of substituted benzoic acid and zinc or zinc-barium phosphates, in the ratios stated, improved the corrosion inhibition substantially when compared to the use of either one of these metal compounds alone in the same coating.

The alkyd resins can be derived from polybasic acids comprising a polycarboxylic acid having at least two carboxyl groups in the molecule. Examples of such acid compounds include the aliphatic saturated dibasic acids such as succinic acid, adipic acid, azelaic acid, sebacic acid, dodecylsuccinic acid and anhydrides thereof; the aliphatic unsaturated dibasic acids such as maleic acid, fumaric acid, itaconic acid-and anhydrides thereof; the aromatic polybasic acids such as phthalic acid, isophthalic acid, terephthalic acid, trimellitic acid, pyromellitic acid and anhydrides thereof; the alicyclic polybasic acids such as tetrahydrophthalic acid, methylcycloyhexenetricarboxylic acid, hexahydrophthalic acid, endomethylenephthalic acid, hexachloroendomethylenetetrahydrophthalic acid, tetrachlorophthalic acid, cyclohexanedicarboxylic acid, methylhexahydrophthalic, acid, hexahydrotrimellitic acid and anhydrides thereof, etc. These acid compounds may be used alone or as a mixture of at least two.

The polyhydric alcohol used to prepare the alkyd resins include alcohols having at least two hydroxyl groups in the molecule. Examples of such alcohols are ethylene glycol, diethylene glycol, triethylene glycol, propylene glycol, dipropylene glycol, butanediol, neopentyl glycol, butylene glycols, pentanediol, 2,3-dimethylpropanediol, hexanediols, hydrogenated bisphenoll-A, cyclohexanedimethanol, trimethylene glycol, tetramethylene glycol, hexamethylene glycol, trimethylolethane, trimethylolpropane, glycerin, pentaerythritol, diglycerin, dipentaerythritol, sorbitol, etc. These alcohols can be used alone or in combination.

The alkyd resins may be prepared from the modified fatty acids. The representative fatty acids are vegetable oil fatty acids. The vegetable oils are drying to semidrying oils (at least about 100 in iodine value) and nondrying oils (less than 100 in iodine value). Examples of fatty acids derived from drying to semidrying oils include safflower oil, linseed oil, soybean oil, sesame oil, poppy seed oil, hemp seed oil, corn oil, tall oil sunflower oil, cotton seed oil, tung oil, dehydrated castor oil, etc. and the nondrying oils such as coconut oil, etc. These fatty acids can be used alone or in combination. Specifically, mixtures of neopentyl glycol, trimethylolpropane, phthalic anhydride, soybean oil fatty acid in xylene are reacted to obtain alkyd resins known in the art.

Examples of organic solvents include the hydrocarbons such as toluene, xylene, naphtha, mineral spirit, octane and cyclohexane; the alcohols such as methanol, ethanol, butanol, cyclohexanol and heptanol; the ethers such as dioxane, methyl cellosolve, butyl cellosolve, methyl carbitol and butyl carbitol; the esters such as ethyl acetate, butyl acetate, methyl cellosolve, cellosolve acetate and carbitol acetate; the ketones such as methyl ethyl ketone, methyl isobutyl ketone, cyclohexanone, isophorone, etc.

These alkyd resins including the various copolymers such as the alkyd-silicone resins may be used alone or with small amounts of other resins such as the phenolic resins, melamine resins, polybutadiene resins, etc. to improve the adhesion, and elasticity, etc. The silicone-modified alkyd resin is the preferred commercial resin system and available from McWhorter Technologies, Inc. as Varkyd 385-50E. In general, the alkyd resins are in solution at concentrations of up to 60% by weight, and therefore it may not be necessary to add additional solvent. Usually, the content of the nonvolatile components in the coating composition of this invention ranges from about 10 to 90% e.g., 35–55% by weight of the total composition. The amount of solvent may vary depending on the visocosity and method of application of the coating onto the substrate.

The coating can be applied to a variety of substrates by conventional application methods such a spraying, dipping, brushing, or flow coating. Substrates that can be coated with the composition are, for example, metal, wood, glass, or plastics such as polypropylene, polystyrene, and the like. The coating is particularly suited for application over pretreated or unprimed metal and can be cured at ambient temperatures or heated at 40°–120° C.

The preferred alkaline earth metal or zinc phosphate used in preparing the coating composition is a zinc-bariumphosphate. The preferred zinc salt of benzoic acid is specifically characterized as having at least one hydroxyl group and nitro ($NO_2$) substituent and molecular weights of about 100–500, e.g. 300 density of about 2–3 grams per mililiter and a specific surface area of $16M^2$/gram. The benzoic acid salts are commercial products obtained from BASF and identified as Sicorin-RZ.

The aluminum triphosphate is characterized as follows and more specifically in Table I.

TABLE I

ALUMINUM TRIPHOSPHATE
$AlH_2P_3O_{10}·2H_2O$

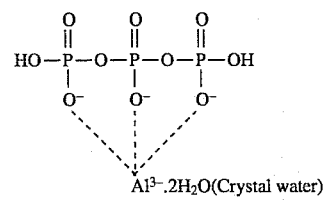

| Substance | Components | TSCA No. |
| --- | --- | --- |
| K-WHITE NO. 82 | $AlH_2P_3O_{10}·2H_2O$ | 13939 - 25 - 8 |
| NO. 84 | $SiO_2$ | 7361 - 86 - 8 |
|  | ZnO | 1314 - 13 - 2 |
| K-WHITE NO. 105 | $AlH_2P_3O_{10}·2H_2O$ | 13939 - 25 - 8 |
|  | ZnO | 1314 - 13 - 2 |
| K-BOND NO. 80 | $AlH_2P_3O_{10}·2H_2O$ | 13939 - 25 - 8 |
|  | $SiO_2$ | 7631 - 86 - 8 |
| K-FRESH NO. 100 | $AlH_2P_3O_{10}·2H_2O$ | 13939 - 25 - 8 |
| K-BOND NO. 90 | $Al(PO_3)_3$ | 13776 - 88 - 0 |
|  | $SiO_2$ | 7631 - 86 - 9 |

The coatings have outstanding performance when exposed to extreme heat conditions, high intensity of light and water, extreme cold conditions, hot lubricating oils and other chemicals normally found in aircraft operations. By utilizing the coating compositions of this invention, a corrosion resistant film can be obtained on various substrates. The coating therefore has properties which function as a primer and more important as a single topcoat which is highly adherent, flexible, chemical resistant and resistant to all weather conditions. The coatings lower the risk of failure due to cracking, especially at low temperatures and are easily touched-up since only one coating need be applied. Since the coating requires only one coat, it requires less time for application and thereby saves on manpower that would generally be needed in the preparation of a two coating system. Moreover, the present coating provides protection at lower film thicknesses thereby reducing the weight of the coating compared to a traditional primer and topcoat paint system which is an important factor when considering aircraft coatings.

It is obvious that there are other variations and modifications which can be made without departing from the spirit and scope of the invention as particularly set forth in the appendant claims.

What is claimed is:

1. A corrosion-resistant self-priming coating comprising from about 30 to 70 parts by weight of an alkyd resin binder, 1 to 30 parts by weight of an alkaline earth metal phosphate, 0.1 to 10 parts by weight of a zinc benzoate, 1 to 30 parts by weight of an aluminum triphosphate, 1 to 40 parts by weight of titanium dioxide, 0 to 2.0 parts by weight of an oil soluble surface active agent and 1 to 40 parts by weight of at least one organic solvent.

2. The coating of claim 1 wherein the alkyd resin ranges from about 40 to 60 parts by weight, titanium dioxide ranges from about 8 to 30 parts by weight, alkaline earth metal phosphate ranges from about 5 to 20 parts by weight, zinc benzoate ranges from about 0.5 to 2.0 parts by weight, aluminum triphosphate ranges from about 5 to 20 parts by weight, the surface active agent ranges from 0.1 to 0.5 parts by weight and the solvent ranges from about 1 to 10 parts by weight.

3. The coating of claim 2 wherein 0 to about 50 percent by weight of the total amount of titanium dioxide is in the form of vesiculated beads.

4. The coating of claim 2 wherein the zinc benzoate is a salt of a substituted benzoic acid having one hydroxyl group and one nitro group.

5. The coating of claim 2 wherein the metal phosphate is a zinc-barium phosphate.

6. The coating of claim 2 wherein the metal phosphate is zinc phosphate.

7. A process of preparing a corrosion-resistant self-priming alkyd coating on a substrate which comprises applying onto the substrate a composition comprising from about 30 to 70 parts by weight of an alkyd resin binder, 1 to 30 parts by weight of an alkaline-earth metal phosphate, 0.1 to 10 parts by weight of a zinc benzoate, 1 to 30 parts by weight of an aluminum triphosphate, 1 to 40 parts by weight of a titanium dioxide pigment, 0 to 2.0 parts by weight of a surface active agent and 1 to 40 parts by weight of at least one organic solvent.

8. The process of claim 7 wherein the metal phosphate is a zinc-barium phosphate.

9. The process of claim 7 wherein the metal phosphate is zinc phosphate.

10. The process of claim 7 wherein the zinc benzoate has a hydroxyl and a nitro substituent.

* * * * *